US009883331B2

(12) United States Patent
Agerstam et al.

(10) Patent No.: US 9,883,331 B2
(45) Date of Patent: Jan. 30, 2018

(54) WIRELESS NETWORK CONNECTIVITY PREDICTION BASED ON USER PATTERNS AND BEHAVIOR

(75) Inventors: Mats Agerstam, Portland, OR (US); Srikathyayani Kathyayani Srikanteswara, Portland, OR (US)

(73) Assignee: Intel Corporation, Santa Clara, CA (US)

(*) Notice: Subject to any disclaimer, the term of this patent is extended or adjusted under 35 U.S.C. 154(b) by 388 days.

(21) Appl. No.: 13/997,819

(22) PCT Filed: Mar. 30, 2012

(86) PCT No.: PCT/US2012/031539
§ 371 (c)(1), (2), (4) Date: Jun. 4, 2014

(87) PCT Pub. No.: WO2013/147862
PCT Pub. Date: Oct. 3, 2013

(65) Prior Publication Data
US 2014/0287773 A1 Sep. 25, 2014

(51) Int. Cl.
*H04W 4/02* (2009.01)
*H04W 48/18* (2009.01)
(Continued)

(52) U.S. Cl.
CPC ............ *H04W 4/02* (2013.01); *G01S 5/0252* (2013.01); *H04W 4/028* (2013.01); *H04W 48/16* (2013.01); *H04W 48/18* (2013.01); *H04W 64/00* (2013.01)

(58) Field of Classification Search
CPC ......... H04W 4/028; H04W 4/02; H04W 4/04; H04W 4/021; H04W 12/08; H04W 64/00;
(Continued)

(56) References Cited

U.S. PATENT DOCUMENTS 8,116,777 B2 2/2012 Klein
8,190,088 B1 * 5/2012 Keshav ................ H04W 56/00 455/41.1

(Continued)

FOREIGN PATENT DOCUMENTS

WO WO-2013147862 A1 10/2013

OTHER PUBLICATIONS

"International Application Serial No. PCT/US2012/031539, International Preliminary Report on Patentability dated Oct. 9, 2014", 7 pgs.

(Continued)

*Primary Examiner* — George Eng
*Assistant Examiner* — Jing Gao
(74) *Attorney, Agent, or Firm* — Schwegman Lundberg & Woessner, P.A.

(57) ABSTRACT

Disclosed in some examples is a method including determining a plurality of user locations, the plurality of user locations determined based upon a clustering of wireless networks scanned by a network interface card communicatively coupled to the processor during an active period of the processor; determining a current location of the user, the current location being one of the plurality of user locations; and scanning for a plurality of wireless networks associated with one or more next locations, the one or more next locations selected from the plurality of user locations based upon the current user location and a measured probability.

39 Claims, 7 Drawing Sheets

1000
1020
SSIDs Seen
A
B
C
D
E
1080
1010
SSIDs Seen
F
G
H
I
J
1070
1040
1050
USER
1030
SSIDs Seen
J
K
L
M
N
1080

(51) Int. Cl.
*H04W 64/00* (2009.01)
*G01S 5/02* (2010.01)
*H04W 48/16* (2009.01)

(58) Field of Classification Search
CPC ... H04W 64/006; H04W 4/025; H04W 4/027; H04W 24/10; H04W 4/008; H04W 12/06; H04W 24/02; H04W 28/0231; H04W 48/16
See application file for complete search history.

(56) References Cited

U.S. PATENT DOCUMENTS

| | | | | |
|---|---|---|---|---|
| 2009/0247170 | A1 | 10/2009 | Balasubramanian et al. | |
| 2009/0318131 | A1* | 12/2009 | Aaron | H04W 4/20 455/423 |
| 2012/0157106 | A1* | 6/2012 | Wang | H04W 16/04 455/446 |
| 2012/0290159 | A1* | 11/2012 | McGee | B60K 6/445 701/22 |
| 2013/0223308 | A1* | 8/2013 | Chandra | H04W 52/0229 370/311 |

OTHER PUBLICATIONS

"International Application Serial No. PCT/US2012/031539, International Search Report and Written Opinion dated Nov. 23, 2012", 10 pgs.

* cited by examiner

4000

| | STATE 1 HOME | STATE 2 WORK | STATE 3 MALL | STATE 4 RESTAURANT |
|---|---|---|---|---|
| STATE 1 HOME | X | 0.7 | 0.2 | 0.1 |
| STATE 2 WORK | 1 | X | 0 | 0 |
| STATE 3 MALL | 0.6 | 0 | X | 0.4 |
| STATE 4 RESTAURANT | 0.5 | 0 | 0.5 | X |

*FIG. 4*

WIRELESS NETWORK CONNECTIVITY PREDICTION BASED ON USER PATTERNS AND BEHAVIOR

PRIORITY CLAIM TO RELATED APPLICATIONS

This application is a national stage application under 35 U.S.C. § 371 of PCT/US2012/031539, filed Mar. 30, 2012, and published as WO 2013/147862 on Oct. 3, 2013, which application and publication are incorporated by reference as if reproduced herein and made a part hereof in their entirety, and the benefit of priority of which is claimed herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright INTEL, Inc., All Rights Reserved.

BACKGROUND

Even as mobile computing devices continue to improve in performance and capability, new use cases for these devices continue to push the boundaries of those capabilities. One such new use case is the Always On, Always Connected (AOAC) use case as applied to these mobile computing devices. AOAC on a mobile computing device means that a user's data continues to find the mobile user regardless of where the mobile computing device is located. While applying AOAC to desktop computers may be trivial as they may remain hooked to the LAN with a constant supply of power, applying AOAC to mobile computing devices present various challenges. For example, mobile computing devices have a limited battery life and less reliable connections to networks. Therefore, solutions which deal with AOAC use cases on mobile computing devices must be mindful of the limited battery capabilities of the devices and the changing nature of their connectivity. Many current solutions to the problem of limited battery life focus on various sleep states of the device in which the device sleeps for a majority of the time and then wakes up to synchronize the user's data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 shows an example transition matrix according to some examples of the present disclosure.

DETAILED DESCRIPTION

Figure 1:
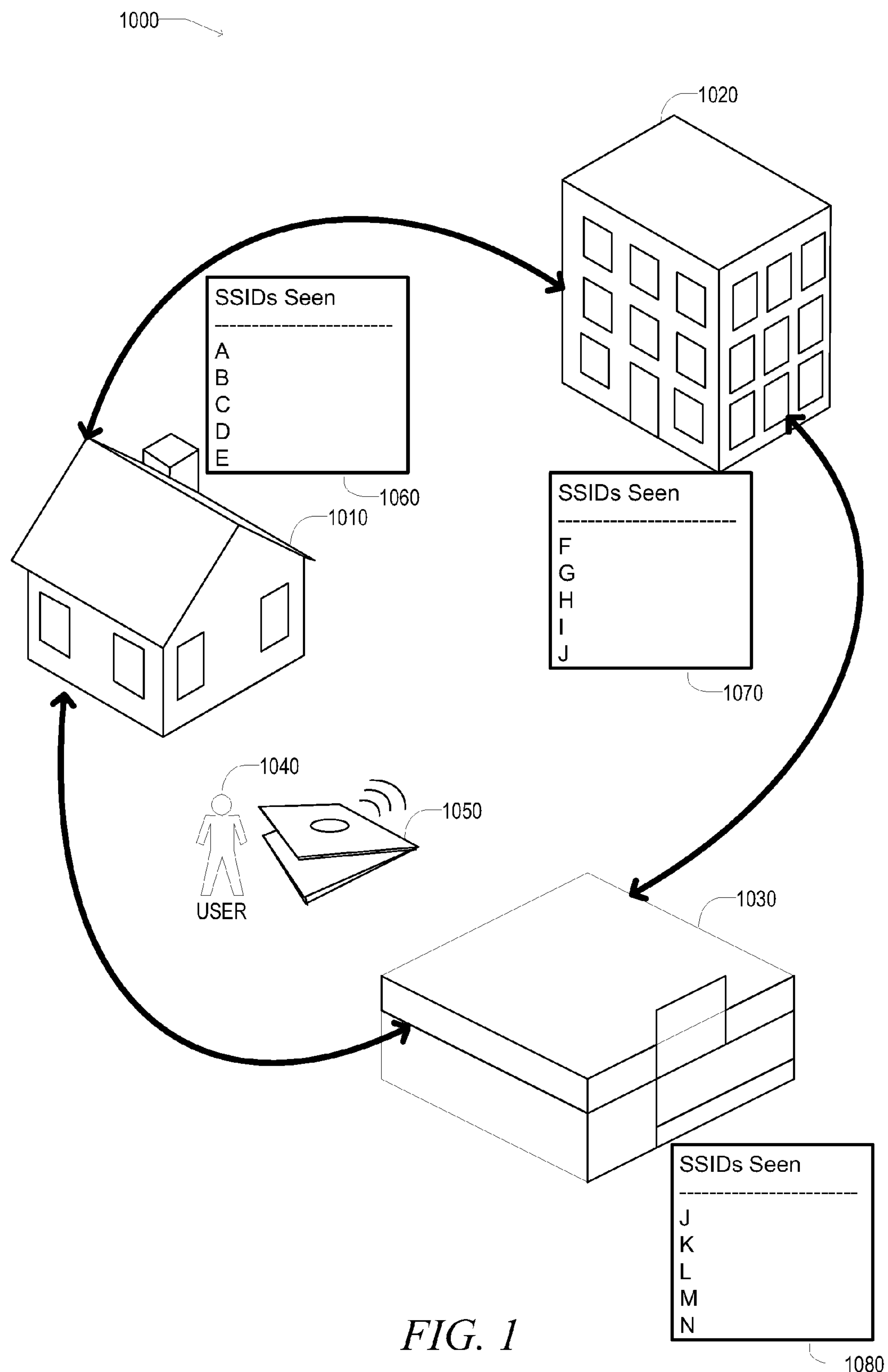
FIG. 1 shows a schematic use case according to some examples of the present disclosure.

NetDetect is one technology that attempts to balance AOAC for mobile computing devices with managing power consumption. NetDetect enables the mobile computing device to scan for the presence of specific and predetermined WiFi Networks (Service Set Identifiers (SSIDs)) while keeping the system in a low powered state. If none of the predetermined SSIDs are detected, the system remains in a low powered state. If the system detects one of the predetermined WiFi networks it wakes up from the low powered state. The system may then establish a network connection to the WiFi network. Applications on the system will then have an opportunity to refresh their data (e.g., sync) before the system is put back to sleep. This allows applications to maintain better data synchronization with other network components (e.g., a network database) while still allowing the device to save power by entering power saving modes at certain times. The WiFi Network Interface Card (NIC) in NetDetect systems can currently store up to 10 predetermined SSIDs with the expectations that this number will increase to ~50 in the near future. In order for NetDetect to work efficiently, it is important that the list of configured SSIDs is as current and accurate as possible. Ideally, all the possible SSIDs that the user can connect to would be in the NIC's list. However, with the advent of Hotspot2.0 and the availability of free and SP (Service Provider) owned hotspots, that number could run into the thousands. Current systems utilize the list of SSIDs that were last detected by the NIC when the mobile computing device was fully powered up. This ignores that the user may have changed locations since the last time the user was active and the mobile computing device was powered up.

In some examples, disclosed are systems, methods, apparatus and machine readable mediums which intelligently select the most likely SSIDs that the user can connect to out of a much larger set of possible SSIDs. This will increase the probabilities that the system will wakeup and sync data applications, thus increasing the user perception that the mobile computing device is AOAC.

In some examples, the system determines the most probable SSIDs to load into the NIC based upon a list of SSIDs known to be associated with a predicted next location of the user. The system may log the list of Basic Service Set Identifiers (BSSIDs) and/or SSIDs that are detected during times when the system is fully active along with a timestamp of when the information was collected. Based on these "traces," the system can infer locations of a user based on similarities in the BSSIDs and/or SSIDs which are scanned by the system in each trace. This inference is done without the necessity for location determination equipment such as Global Positioning Systems (GPS). Essentially, the list of networks the system sees is a proxy for knowing exact coordinates of a particular location.

Once the system determines a set of possible locations, the system may construct a probability matrix (which is calculated based upon the traces) which describes, given a current location, the probability that the user will move to one of the other inferred locations. The SSIDs which are associated with one or more of the most likely next location(s) may be used by the NIC as the NetDetect SSID list.

Turning now to FIG. 1, an example use case 1000 is shown. The user 1040 may travel between their home 1010, an office (for work) 1020, and a shopping center, restaurant, or other public place 1030. While at one of these locations a user 1040 may bring with him or her portable computing device 1050. The portable computing device 1050 in some examples may be a laptop, cellphone, smartphone, tablet pc, or the like.

Upon using the mobile computing device 1050, the network interface card (NIC) may scan for available wireless networks. For example, at home 1010 the NIC may observe the list of wireless networks 1060 (networks A, B, C, D, E), at work the NIC may observe the list of wireless networks 1070 (F, G, H, I, J), and at the public place 1030, the NIC may observe wireless networks 1080 (J, K, L, M, N). For example, if mobile computing device 1050 contains a wireless NIC card which enables the mobile computing device 1050 to connect to a wireless network operating in accordance with an Institute of Electrical and Electronics Engineers (IEEE) 802.11 family of standards (such as 802.11n-2009 published 2009), the NIC card will be able to see a number of SSIDs broadcast by various wireless access points in range of the user's location. These represent networks to which the wireless NIC card may attempt to connect to. Unless home 1010, office 1020, and public location 1030 are very close together, the list of SSIDs that the wireless NIC sees will be different enough for the system to infer (over time) a number of locations based on the wireless networks observed by periodic scans by the NIC. For example, in FIG. 1, three locations may be inferred (home, work, and a public place). While the SSIDs seen at work 1020 and public place 1030 overlap somewhat (i.e. a common network "J"), the differences are enough that the system will likely differentiate between them.

Based on the inferred locations and other information collected by the system (e.g, the timestamps), the system can calculate the probability that based on a current location, the user is going to move to a given second location. The SSIDs commonly seen at the second location can be loaded into the NIC before the computing device is put into a low power state. For example, when user 1040 closes the lid of mobile computing device 1050, the mobile computing device 1050 may determine its current location by comparing the SSIDs currently observed with the SSIDs associated with the various stored locations. Once the current location is determined, the mobile computing device 1050 may determine one or more likely next locations (based on the observed data) and preload some of the SSIDs associated with those locations into the NIC before going into a low power state. The NIC then has the list of SSIDs that correspond to the most probable destination to which the user is taking the mobile computing device. This may increase the likelihood that a SSID to which the user may connect may be located and connected to. This will allow the applications which need to synchronize with other resources across a network (e.g., an Internet) to do so more often.

Figure 2:
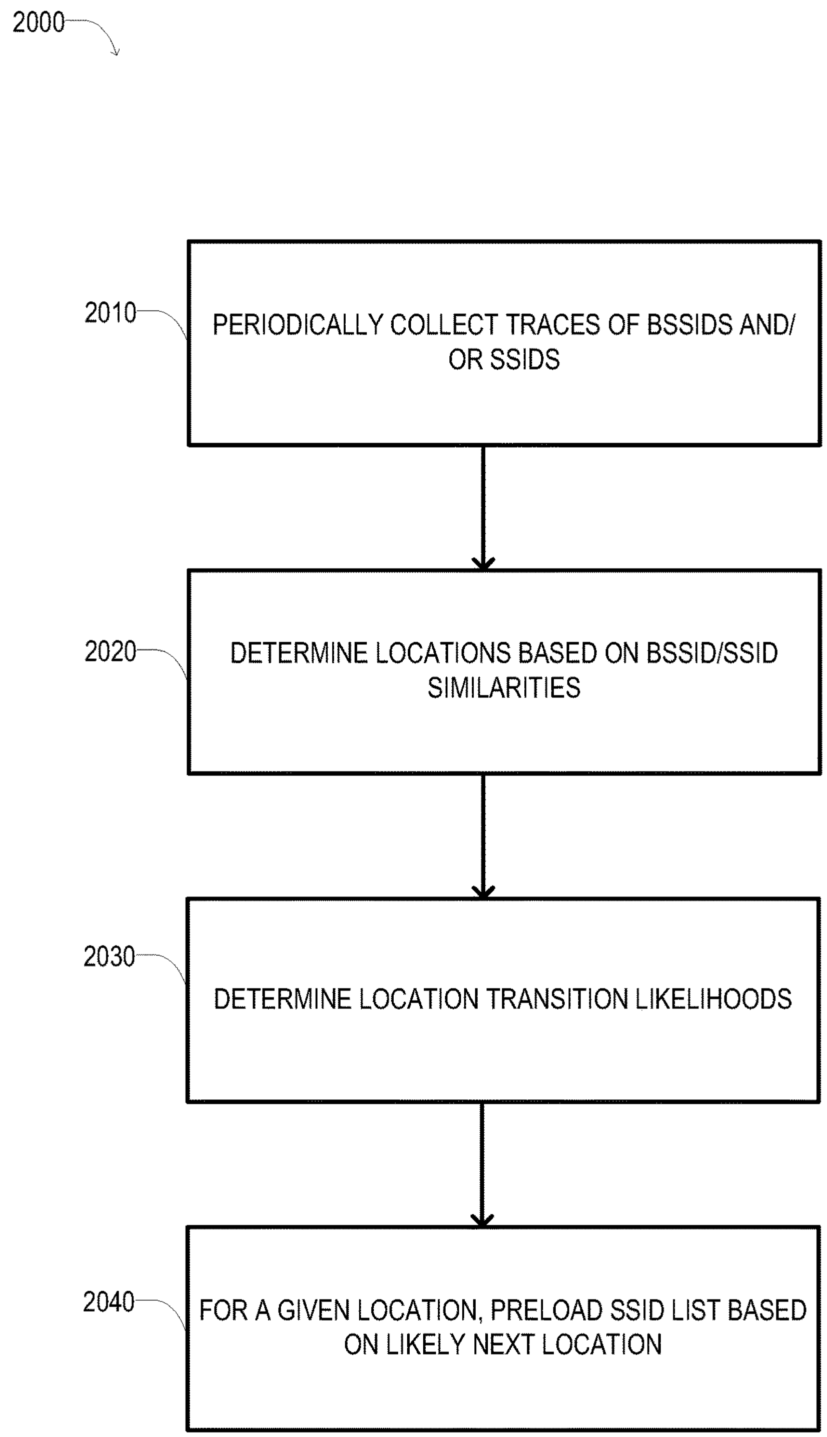
FIG. 2 shows a flowchart of a method of wireless network prediction according to some examples of the present disclosure.

Turning now to FIG. 2, a method 2000 of loading the NIC with likely SSIDs is shown. The NIC may periodically collect a list of SSIDs and/or BSSIDs that it sees at various times at operation 2010. In some examples, the NIC may collect this information only when the portable computing device is active and powered on. In some examples, the user of the device may have to be actively using the device (e.g., the lid of the device if the portable computing device is a laptop may be open, or the like). In other examples, the NIC may periodically scan for SSIDs and/or BSSIDs that it can see at various time intervals regardless of the power status of the device. Based on similarities of the observed BSSIDs and/or SSIDs, the processor of the portable computing device (or a processor on the NIC card) may determine one or more discrete locations at operation 2020. These locations correspond to sets of SSIDs and/or BSSIDs which are similar.

Using the set of locations and other collected information, the system may determine likely transitions between locations at operation 2030. For example, if 80% of the time a user moved from a first location the system recognized based on the observed wireless networks that were available to a second location the system recognizes, and 20% of the time moved from the first location to a third location, the system knows that it is likely that the user is going to move to the second location given that they are in the first location. In response to this, given the current set of observed wireless networks, the system may determine its current location, and using the observed probabilities, may determine its next likely location. Given its next likely location, the system may preload the SSIDs associated with the next likely location at operation 2040.

Figure 3A:
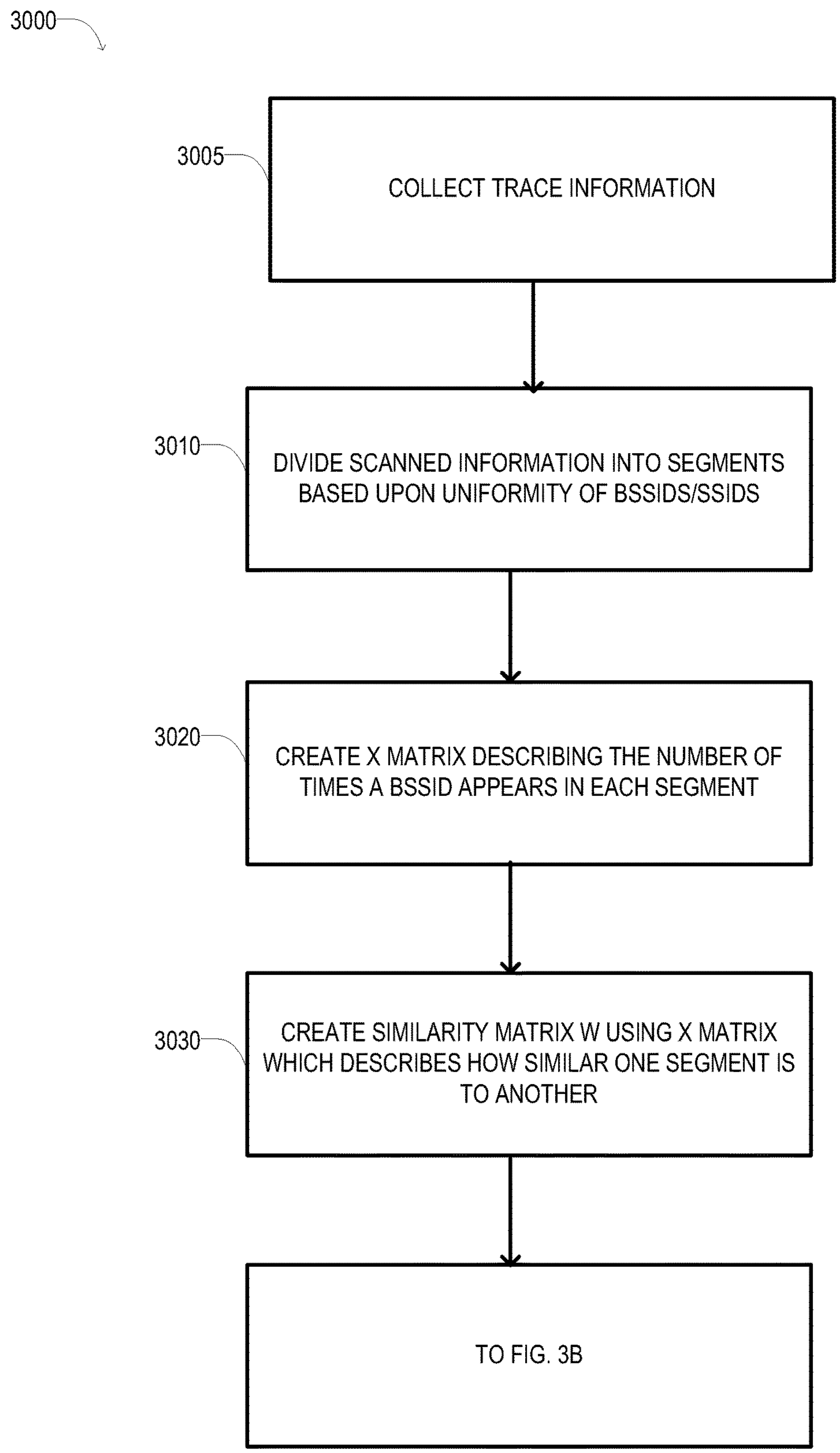
FIG. 3A shows a flowchart of a method for determining locations according to some examples of the present disclosure.

Turning now to FIG. 3A, a method 3000 of determining locations is shown. At operation 3005 the NIC card may collect trace information. As used herein, trace information may comprise a timestamp, along with a list of BSSIDs and/or SSIDs observed at that time. As already explained, in some examples, the traces may be collected periodically. At operation 3010, the trace information may be divided into a plurality of segments based upon a uniformity of the BSSIDs and/or SSIDs in each trace. Each segment may constitute the period of time the system infers the user is in one location. Which traces belong in a particular segment may be calculated by calculating a stable rate of BSSIDs and/or SSIDs and comparing the stable rate against one or more predetermined thresholds. The stable rate may be the percentage of common BSSIDs and/or SSIDs seen between two successive trace points (e.g., the number of common SSIDs/BSSIDs seen between two successive traces divided by the sum of all SSIDs/BSSIDs seen at the two trace points). If the stable metric is above a threshold, it indicates the user is likely in the same location. If the stable metric is not above the threshold, the system presumes the user moved and creates a new segment.

Since BSSIDs have a much greater variation than the SSIDs even when the user is in one location, one example uses observed BSSIDs to determine changes in segments at operation 3010. This may be beneficial as changes in the observed list of BSSIDs gives a more accurate estimate of the change in segment and location of the user as opposed to examples that just utilize the observed SSIDs (as a single SSID may have multiple broadcasting BSSIDs). However, this may have the disadvantage in that the observed BSSIDs can be very noisy. In some examples, utilizing observations of both the SSIDs observed and the BSSIDs observed may help smooth out the noise while maintaining the accuracy of the BSSIDs. In these examples, the system uses a first predetermined threshold value for the observed set of BSSIDs as well as a second predetermined threshold value for the observed set of SSIDs in order to determine a stable segment. Both the stable rate of the observed BSSIDs and the set of observed SSIDs must be above their respective thresholds in order to constitute a change in segment. If either one is below the threshold, then the system presumes that there is no segment changes. Thus, the SSID threshold may smooth out the very high variations in BSSIDs. Just relying on the SSIDs may not be optimal as the system may not accurately determine the appropriate segments. Note that each BSSID may have an associated SSID.

At operation 3020, the system may create a matrix "X" which may describe the number of times a particular BSSID appears in a particular segment. The X matrix is a matrix which in some examples has one column for each unique BSSID and one row for each determined segment. Each value of the X matrix indicates the frequency of that BSSID in a particular segment.

It should be noted that the BSSID was utilized in the present example to compute the X matrix as it is the most granular network identifier and the use of the SSID in traces in some examples may be to simply smooth out the fluctuations in the BSSIDs. As already stated, in other examples, the SSID may be used to determine segments. Thus, in other examples the X matrix may be calculated based on SSID (e.g., in examples in which the BSSID is not collected or used).

Based upon the X matrix, the system may then create a similarity matrix W at operation 3030. W describes how similar a particular segment is to another particular segment. In some examples, W has one row and one column for each segment. Each element of W is a measure of how similar the segment of the element's row is to the segment of the element's column. For example, if X(row, column) is an element of matrix X, a variable x may be defined as the minimum of (X(i,:),X(j,:)); and W(i, j)=sum(x)*2/(sum(X(i, :))+sum(X(j, :))). This means that we take the min number of times each BSSID (or SSID in other examples) is present in each segment and compare it to the total number of times a BSSID (or SSID in other examples) is present in each segment. A higher value indicates a higher level of similarity.

Figure 3B:
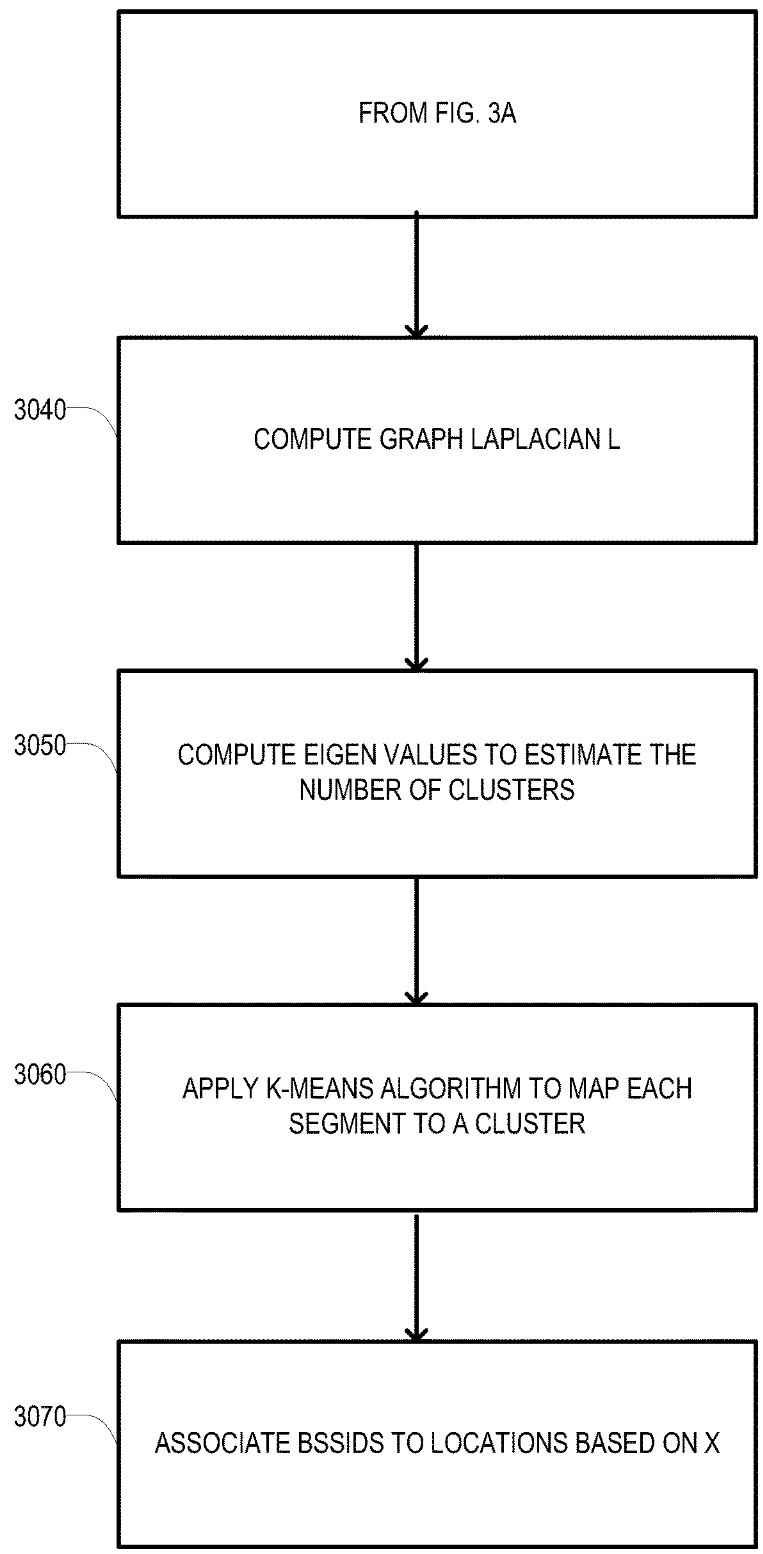
FIG. 3B shows a flowchart of a method for determining locations according to some examples of the present disclosure.

Continuing on FIG. 3B, at operation 3040, the system computes a graph laplacian L and then computes eigen values to estimate the number of clusters at operation 3050. These are steps which are precursors to utilizing the K means clustering. When you compute the eigen values of the graph Laplacian it can be used as an estimate of the total number of clusters. In some examples, the number of clusters would be the final number of segments. Initially when the segments are computed, it is to see how similar they are to each other and eventually cluster them into final segments or different areas that the user has been to.

At operation 3060, the segments are clustered together using a K-Means algorithm (or some equivalent). Each cluster is a group of segments which are similar enough in time and observed BSSIDs (and/or SSID in other examples) to be considered a separate location.

Each location has a number of SSIDs and/or BSSIDs associated with it based on the likelihood that the SSID and/or BSSID is available at a particular location. In some examples, if a BSSID and/or an SSID is observed in a given location greater than a threshold amount of times, or a threshold percentage, then the SSID, or the SSID associated with the given BSSID, is associated with the location. Note that each BSSID will be associated with an SSID.

Once the locations and the associated BSSIDs and/or SSIDs are determined, a transition matrix may be created. In some examples, this may be a Markov Transition matrix. This may be based upon the segments previously computed. An example transition matrix is shown in FIG. 4, with four states (i.e., inferred locations). The matrix indicates, that given a particular current state (i.e., current location), the probability that a user will travel to a different state (i.e., location). For example, the transition matrix of FIG. 4 states that if the user is currently home, they have a 70% chance of going to work, a 20% chance of going to the mall, and a 10% chance of going to the restaurant. While the transition matrix in FIG. 4 describes the states with reference to example locations (e.g., home) the system does not have coordinates or names of these locations. Rather, the locations are described by the co-occurrence of BSSIDs and/or SSIDs seen by a scan for SSIDs and/or BSSIDs.

In some examples, the system may select the SSIDs associated with the most probable next location/state to load into the NIC. However, in some examples the number of SSIDs associated with the most probable location may exceed the storage capacity of the NIC. In these examples, the system may choose the SSIDs according to a defined algorithm. For example, the system may store the SSIDs which historically have transmitted the strongest signal. In other examples, the system may store the SSIDs which the user has historically connected to, or in yet other examples, the system may not store SSIDs which the user is unable to connect to.

In still other examples, the system may not fill the list with SSIDs from a single location only, but may utilize the probabilities to determine which SSIDs to load into the NIC. For example, the system may load a portion of the SSIDs for multiple locations. In some examples, each location may load in a proportionate amount of their associated SSIDs commensurate with the probability that the particular location is the next location. Thus in the example transition matrix of FIG. 4, if the user is currently home, and if the user's NIC can hold 50 SSIDs, then 70% of them (35 SSIDs) will be loaded with SSIDs from work, 20% from the mall (10 SSIDs) and 10% from the restaurant (5 SSIDs). The SSIDs selected from each location (if there are more SSIDs than the allotted amount for a particular location) may be based upon strongest signal, historical connections, ability to connect, or the like. In other examples, the system may be adaptive in that if there are not enough networks associated with a particular location to fill their entire slot, the open slots from that location may be distributed to other locations. Thus, in the example of FIG. 4, if the work location has 21 SSIDs associated with it, the remaining 14 slots may be distributed to the mall location and the restaurant location. The distribution may be done evenly (e.g., 7 each) or proportionally based on probability (e.g., the mall would get 9 of the extra slots and the restaurant would get roughly 5).

In some examples, time may factor into the location determination. For example, the BSSIDs/SSIDs that the wireless network sees in each location may not be perfectly constant across different time periods (e.g., the wireless networks seen at home during breakfast may be different than those seen at home at night). In some examples, there will be enough commonalities among the scanned BSSIDs/SSIDs between the different time periods that the system may still recognize both traces as emanating from the same location. In other examples, if the differences are too great, the system may create a second inferred location corresponding to the same physical location. However, this may be beneficial as this may allow the system to more accurately compute the probable next location based on not only current location, but current time (e.g., you may be more likely to go to work in the morning from home, and more likely to go to a public place from home in the evening), but also load the most likely SSIDs for that physical location for the appropriate time (e.g., load the SSIDs seen most during the evening when the user is most likely to go to that place in the evening). Thus the inferred locations may also have a temporal component as well.

In addition to the fact that time may be factored in through observed differences in networks at different locations, time may be explicitly factored into the clustering equation based on the timestamps collected with the traces. Because time may also be considered in clustering, the same physical location may have multiple locations associated with it as far as the system is concerned. Thus the same physical location may have different inferred locations in time based on either variance in SSIDs/BSSIDs seen in those times, or through the use of clustering based on time. This may factor in to the location prediction algorithms as it will assist the system in more accurately predicting the user's next move. For example, if a user is at their house in the morning on a weekday, it is likely they will move to work next. However, if the user is at their house in the early evening, it is less likely they will return to work, and it is more likely that they will go to the mall or some other location next. In other examples, the system may not cluster based on timestamp, but may cluster independent of time.

The operations necessary to practice the methods of this disclosure may be done at the network interface card (NIC), a general processor (such as a central processing unit), or any other component of the mobile computing device. In other examples, some of the operations may be done on the NIC, while other operations may be done on other components (e.g., the CPU). While the examples of the present disclosure mention WiFi wireless networks, one skilled in the art with the benefit of Applicant's disclosure will appreciate that the methods, apparati, systems, and machine-readable of the present disclosure may be utilized on other wireless networks. For example, the method may be utilized by a wireless network such as a Long Term Evolution (LTE) network which may utilize the methods disclosed herein to predict the likely set of base stations which the user may travel to next.

Figure 6:
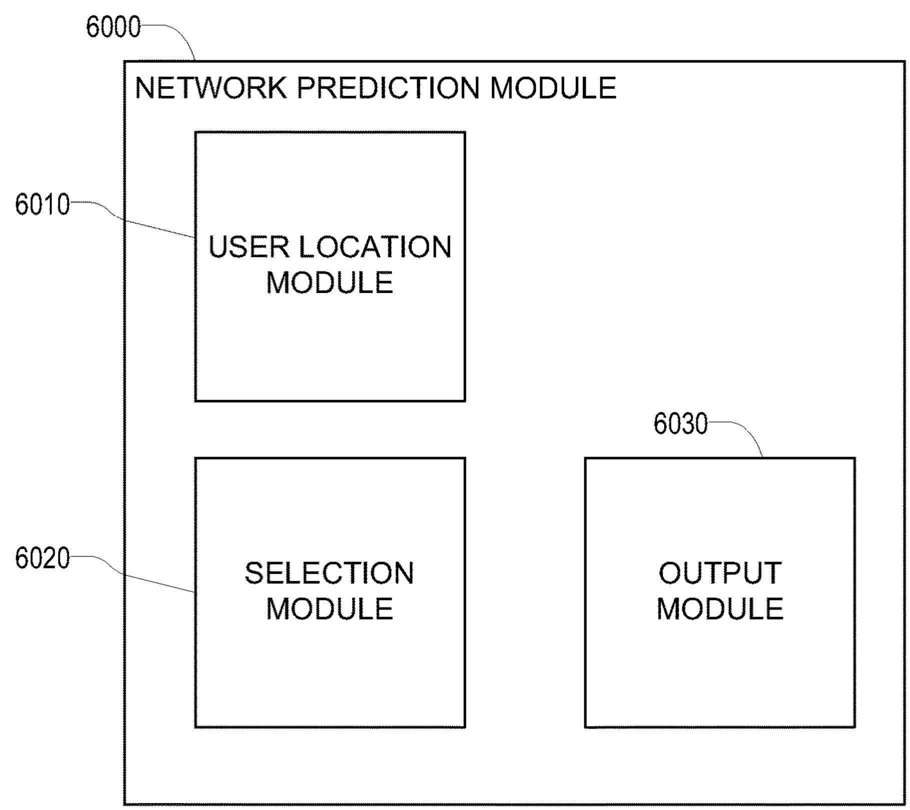
FIG. 6 shows a schematic of a network prediction module according to some examples of the present disclosure.

Turning now to FIG. 6 a network prediction module 6000 is shown which may operate according to the present disclosure. The network prediction module 6000 may predict one or more next wireless networks based upon a current location and one or more next locations. User location module 6010 is configured to determine a plurality of user locations, the plurality of user locations determined based upon a clustering of wireless networks seen by the computing device during an active period of the computing device; and determine a current location of the user, the current location being one of the plurality of user locations. The user location module may be configured to determine the current location of the user based upon a comparison of a plurality of wireless networks currently scanned and a plurality of wireless networks associated with the plurality of user locations. The user location module 6010 may also be configured to determine a plurality of user locations by creating a plurality of traces, each trace containing a list of a plurality of wireless networks scanned during a particular period of time, dividing the plurality of traces into a plurality of segments, each segment comprising at least two traces, the at least two traces grouped into the segment based upon a uniformity of the wireless networks associated with the at least two segments, and creating a plurality of clusters comprised of at least two segments based upon a similarity of the at least two segments, each of the plurality of clusters corresponding to a location. The user location module 6010 may also be configured to determine a plurality of wireless networks associated with the plurality of clusters based upon a determination that the wireless networks associated with the plurality of clusters are likely to be available at the associated location. The user location module 6010 may be configured to determine that the wireless networks associated with the plurality of clusters are likely to be available at the associated location by determining that the wireless networks associated with a particular location are present in that location above a threshold amount of times.

The network prediction module 6000 may also include a selection module 6020 which may be configured to select one or more next locations from the plurality of user locations based upon the current user location and a measured probability. The selection module 6020 may be configured to calculate a transition matrix based upon the clustering of similar wireless networks scanned and determine the one or more next locations by determining the most probable next locations based upon the transition matrix and the current user location.

The network prediction module 6000 may also include an output module 6030, configured to store the plurality of wireless networks associated with one or more next locations, for example, storage in a NetDetect list in a network interface card.

The network prediction module 6000 may be part of one or more processors in the computing device, such as a central processing unit, or on one or more processors associated with a network interface card, or some other device in the computing device, or a combination of locations.

EXAMPLE MACHINE

Figure 5:
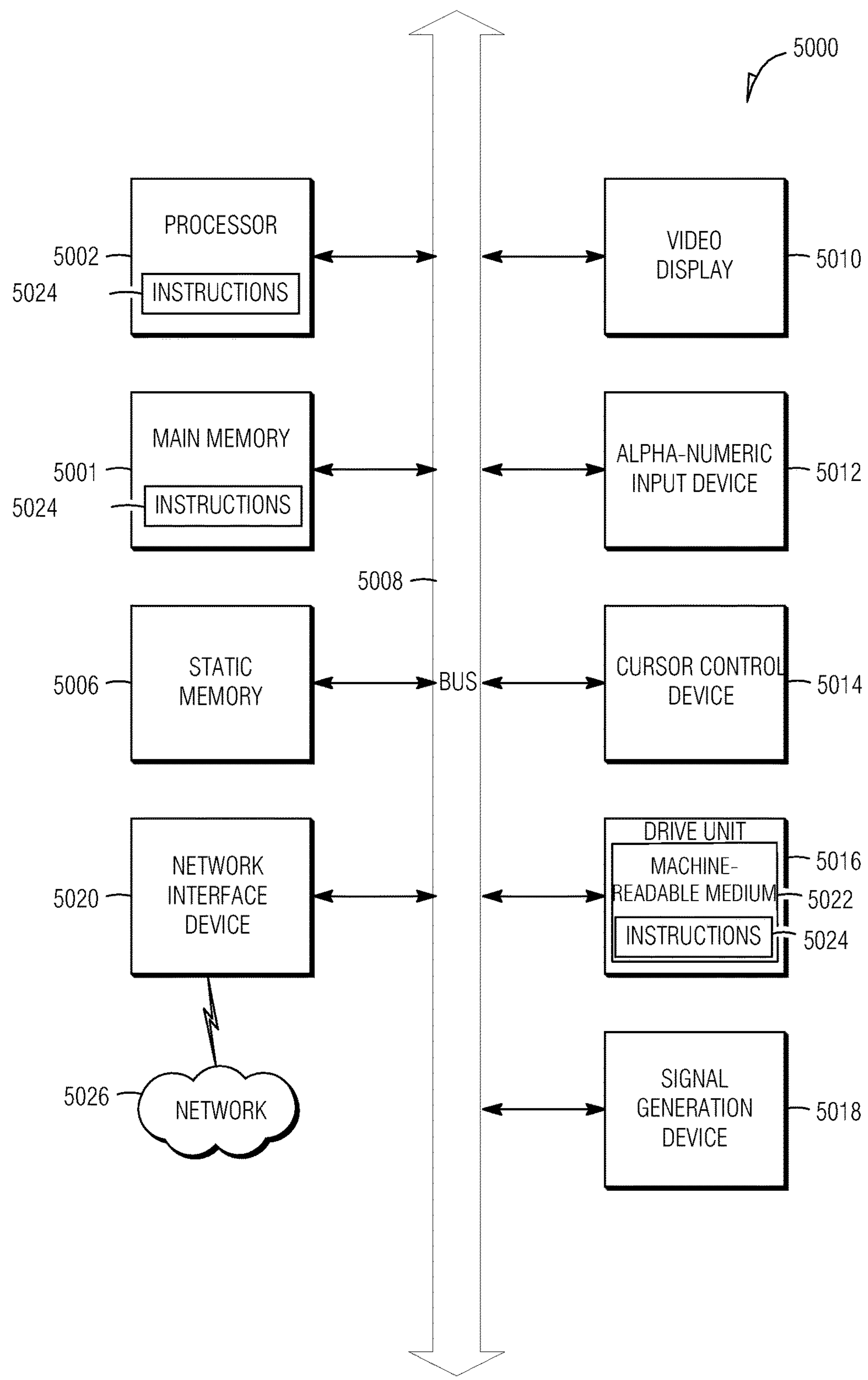
FIG. 5 shows a schematic of a machine according to some examples of the present disclosure.

FIG. 5 illustrates a block diagram of an example machine 5000 upon which any one or more of the techniques (e.g., methodologies) discussed herein can be performed. The mobile computing device may be or include one or more components of machine 5000. In various embodiments, the machine 5000 can operate as a standalone device or can be connected (e.g., networked) to other machines. In a networked deployment, the machine 5000 can operate in the capacity of a server machine, a client machine, or both in server-client network environments. In an example, the machine 5000 can act as a peer machine in peer-to-peer (P2P) (or other distributed) network environment. The machine 5000 can be a personal computer (PC), a tablet PC, a set-top box (STB), a Personal Digital Assistant (PDA), a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 5000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time. Or to constitute one or more modules at the same time.

Machine (e.g., computer system) 5000 can include a hardware processor 5002 (e.g., a central processing unit (CPU), a graphics processing unit (GPU), a hardware processor core, or any combination thereof), a main memory 5004 and a static memory 5006, some or all of which can communicate with each other via a bus 5008. The machine 5000 can further include a display unit 5010, an alphanumeric input device 5012 (e.g., a keyboard), and a user interface (UI) navigation device 5011 (e.g., a mouse). In an example, the display unit 5010, input device 5017 and UI navigation device 914 can be a touch screen display. The machine 5000 can additionally include a storage device (e.g., drive unit) 5016, a signal generation device 5018 (e.g., a speaker), a network interface device 5020 (e.g, a NIC—which may itself include one or more processors), and one or more sensors 5021, such as a global positioning system (GPS) sensor, compass, accelerometer, or other sensor. The machine 5000 can include an output controller 5028, such as a serial (e.g., universal serial bus (USB), parallel, or other wired or wireless (e.g., infrared(IR)) connection to communicate or control one or more peripheral devices (e.g., a printer, card reader, etc.).

The storage device 5016 can include a machine-readable medium 5022 on which is stored one or more sets of data structures or instructions 5024 (e.g., software) embodying or utilized by any one or more of the techniques or functions described herein. The instructions 5024 can also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 can constitute machine readable media.

While the machine-readable medium 5022 is illustrated as a single medium, the term "machine readable medium" can include a single medium or multiple media (e.g., a centralized or distributed database, and/or associated caches and servers) that configured to store the one or more instructions 5024.

The term "machine-readable medium" can include any tangible medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 5024 can further be transmitted or received over a communications network 5026 using a transmission medium via the network interface device 5020. Network interface device 5020 may connect the machine 5000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as a Long Term Evolution (LTE) network, Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 5020 can include one or more physical jacks (e.g., Ethernet, coaxial, or phone jacks) or one or more antennas to connect to the communications network 5026. In an example, and as shown in FIG. 5, the network interface device 5020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 5000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

OTHER NOTES AND EXAMPLES

Example 1

A method including determining a plurality of user locations using one or more processors, the plurality of user locations determined based upon a clustering of wireless networks scanned by a network interface card communicatively coupled to the processor during an active period of the processor; determining a current location of the user, the current location being one of the plurality of user locations; and scanning for a plurality of wireless networks associated with one or more next locations, the one or more next locations selected from the plurality of user locations based upon the current user location and a measured probability.

Example 2

The method of example 1, including determining the current location of the user based upon a comparison of a plurality of wireless networks currently scanned and a plurality of wireless networks associated with the plurality of user locations.

Example 3

The method of any one of examples 1-2, wherein determining a plurality of user locations using one or more processors includes creating a plurality of traces, each trace containing a list of a plurality of wireless networks scanned during a particular period of time; dividing the plurality of traces into a plurality of segments, each segment comprising at least two traces, the at least two traces grouped into the segment based upon a uniformity of the wireless networks associated with the at least two segments; and creating a plurality of clusters comprised of at least two segments based upon a similarity of the at least two segments, each of the plurality of clusters corresponding to a location.

Example 4

The method of any one of examples 1-3, wherein the plurality of clusters are created using a K-means algorithm.

Example 5

The method of any one of examples 1-4, including determining a plurality of wireless networks associated with the plurality of clusters based upon a determination that the wireless networks associated with the plurality of clusters are likely to be available at the associated location.

Example 6

The method of example 5, wherein the determination that the wireless networks associated with the plurality of clusters are likely to be available at the associated location comprises determining that the wireless networks associated with a particular location are present in that location above a threshold amount of times.

Example 7

The method of any one of examples 1-6, wherein the wireless networks are wireless networks operating in accordance with an 802.11 family of standards.

Example 8

The method of any one of examples 1-6, including calculating a transition matrix based upon the clustering of similar wireless networks scanned and wherein determining the one or more next locations comprises determining the most probable next locations based upon the transition matrix and the current user location.

Example 9

The method of any one of examples 1-6, wherein scanning for the plurality of wireless networks is done in response to powering down the processor into a low power state.

Example 10

The method of any one of examples 1-6, wherein responsive to finding one of the plurality of networks associated with one or more next locations, connecting to the found one or more of the plurality of networks.

Example 11

The method of example 10, comprising waking up one or more of the processors and notifying one or more applications to synchronize data over the connected wireless network responsive to connecting to the found one or more of the plurality of networks.

Example 12

A computing device including one or more processors configured to: determine a plurality of user locations, the plurality of user locations determined based upon a clustering of wireless networks scanned by a network interface card communicatively coupled to the processor during an active period of the processor; determine a current location of the user, the current location being one of the plurality of user locations; and scan for a plurality of wireless networks associated with one or more next locations, the one or more next locations selected from the plurality of user locations based upon the current user location and a measured probability.

Example 13

The computing device of example 12, wherein the one or more processors are configured to determine the current location of the user based upon a comparison of a plurality of wireless networks currently scanned and a plurality of wireless networks associated with the plurality of user locations.

Example 14

The computing device of any one of examples 12 or 13, wherein the one or more processors are configured to determine a plurality of user locations by: creating a plurality of traces, each trace containing a list of a plurality of wireless networks scanned during a particular period of time; dividing the plurality of traces into a plurality of segments, each segment comprising at least two traces, the at least two traces grouped into the segment based upon a uniformity of the wireless networks associated with the at least two segments; and creating a plurality of clusters comprised of at least two segments based upon a similarity of the at least two segments, each of the plurality of clusters corresponding to a location.

Example 15

The computing device of any one of examples 12-14, wherein the plurality of clusters are created using a K-means algorithm.

Example 16

The computing device of any one of examples 12-15, wherein the one or more processors are configured to determine a plurality of wireless networks associated with the plurality of clusters based upon a determination that the wireless networks associated with the plurality of clusters are likely to be available at the associated location.

Example 17

The computing device of example 16, wherein the one or more processors are configured to determine that the wireless networks associated with the plurality of clusters are likely to be available at the associated location by determining that the wireless networks associated with a particular location are present in that location above a threshold amount of times.

Example 18

The computing device of any one of examples 12-17, wherein the wireless networks are wireless networks operating in accordance with an 802.11 family of standards.

Example 19

The computing device of any one of examples 12-17, wherein the one or more processors are configured to calculate a transition matrix based upon the clustering of similar wireless networks scanned and wherein the one or more processors are configured to determine the one or more next locations by determining the most probable next locations based upon the transition matrix and the current user location.

Example 20

The computing device of any one of examples 12-17, wherein the one or more processors are configured to scan for the plurality of wireless networks in response to powering down the one or more processors into a low power state.

Example 21

The computing device of any one of examples 12-17, wherein the one or more processors are configured to connect to the found one or more of the plurality of networks in response to finding one of the plurality of networks associated with one or more next locations.

Example 22

The computing device of example 21, wherein the one or more processors are configured to wake up and notify one or more applications to synchronize data over the connected wireless network responsive to connecting to the found one or more of the plurality of networks.

Example 23

A machine readable medium that stores instructions which when performed by a machine, cause the machine to perform operations including: determine a plurality of user locations, the plurality of user locations determined based upon a clustering of wireless networks scanned by a network interface card communicatively coupled to the processor during an active period of the processor; determine a current location of the user, the current location being one of the plurality of user locations; and scan for a plurality of wireless networks associated with one or more next locations, the one or more next locations selected from the plurality of user locations based upon the current user location and a measured probability.

Example 24

The machine readable medium of example 23, wherein the instructions for determining the current location of the user include instructions, which when performed by the machine, cause the machine to determine the current location of the user based upon a comparison of a plurality of wireless networks currently scanned and a plurality of wireless networks associated with the plurality of user locations.

Example 25

The machine readable medium of any one of examples 23 or 24, wherein the instructions for determining a plurality of user locations comprise instructions which when performed by the machine, cause the machine to perform the operations of: creating a plurality of traces, each trace containing a list of a plurality of wireless networks scanned during a particular period of time; dividing the plurality of traces into a plurality of segments, each segment comprising at least two traces, the at least two traces grouped into the segment based upon a uniformity of the wireless networks associated with the at least two segments; and creating a plurality of clusters comprised of at least two segments based upon a similarity of the at least two segments, each of the plurality of clusters corresponding to a location.

Example 26

The machine readable medium of any one of claims 23-25, wherein the instructions for creating a plurality of clusters include instructions which when performed by the machine cause the machine to create the plurality of clusters using a K-means algorithm.

Example 27

The machine readable medium of any one of example 25-26, wherein the instructions for determining the plurality of wireless networks associated with the plurality of clusters comprises instructions, which when performed by the machine, cause the machine to determine the plurality of wireless networks based upon a determination that the wireless networks associated with the plurality of clusters are likely to be available at the associated location.

Example 28

The machine readable medium of example 27, wherein the instructions for determining that the wireless networks associated with the plurality of clusters are likely to be available at the associated location includes instructions which when performed by the machine causes the machine to perform the operations of determining that the wireless networks associated with a particular location are present in that location above a threshold amount of times.

Example 29

The machine readable medium of any one of examples 23-28, wherein the wireless networks are wireless networks operating in accordance with an 802.11 family of standards.

Example 30

The machine readable medium of any one of examples 23-28, wherein the instructions include instructions which when performed by the machine, cause the machine to perform the operations of calculating a transition matrix based upon the clustering of similar wireless networks scanned and wherein the instructions for determining the one or more next locations include instructions, which when performed by the machine cause the machine to perform the operations of determining the most probable next locations based upon the transition matrix and the current user location.

Example 31

The machine-readable medium of any one of examples 23-28, wherein the instructions include instructions which when performed by the machine cause the machine to scan for the plurality of wireless networks in response to powering down a processor into a low power state.

Example 32

The machine-readable medium of any one of examples 23-28, wherein the instructions include instructions which when performed by the machine cause the machine to perform the operations of: responsive to finding one of the plurality of networks associated with one or more next locations, connecting to the found one or more of the plurality of networks.

Example 33

The machine-readable medium of example 32, wherein the instructions include instructions which when performed by the machine cause the machine to perform the operations of: waking up the processor and notifying one or more applications to synchronize data over the connected wireless network responsive to connecting to the found one or more of the plurality of networks.

Example 34

An apparatus including a user location module configured to: determine a plurality of user locations, the plurality of user locations determined based upon a clustering of wireless networks seen by a computing device during an active period of the computing device; and determine a current location of the user, the current location being one of the plurality of user locations; a selection module, configured to select one or more next locations from the plurality of user locations based upon the current user location and a measured probability; and an output module, configured to output the plurality of wireless networks associated with one or more next locations to a network interface card.

Example 35

The apparatus of example 34, wherein the user location module is configured to determine the current location of the user based upon a comparison of a plurality of wireless networks currently scanned and a plurality of wireless networks associated with the plurality of user locations.

Example 36

The apparatus of any one of examples 34 or 35, wherein the user location module is configured to determine a plurality of user locations by: creating a plurality of traces, each trace containing a list of a plurality of wireless networks scanned during a particular period of time; dividing the plurality of traces into a plurality of segments, each segment comprising at least two traces, the at least two traces grouped into the segment based upon a uniformity of the wireless networks associated with the at least two segments; and creating a plurality of clusters comprised of at least two segments based upon a similarity of the at least two segments, each of the plurality of clusters corresponding to a location.

Example 37

The apparatus of example 34-36, wherein the user location module is configured to determine a plurality of wireless networks associated with the plurality of clusters based upon a determination that the wireless networks associated with the plurality of clusters are likely to be available at the associated location.

Example 38 apparatus of example claim 37, wherein the user location module is configured to determine that the wireless networks associated with the plurality of clusters are likely to be available at the associated location by determining that the wireless networks associated with a particular location are present in that location above a threshold amount of times.

Example 39

The apparatus of any one of examples 34-38, wherein the selection module is configured to calculate a transition matrix based upon the clustering of similar wireless networks scanned and wherein the selection module is configured to determine the one or more next locations by determining the most probable next locations based upon the transition matrix and the current user location.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:

activating a network interface card coupled to one or more processors, the one or more processors alternating between an active state and a low power state;

determining a plurality of locations for the network interface card using the one or more processors, the plurality of locations for the network interface card determined based upon a clustering of wireless networks scanned by the network interface card during an active period of the one or more processors, the one or more processors operating in the active state during the active period; determining a current location of the network interface card, the current location being one of the plurality of locations for the network interface card, wherein determining the current location of the network interface card is completed upon initiating a transition of the one or more processors from the active state to the low power state; and scanning, in the low power state, for a plurality of wireless networks associated with one or more next locations, the one or more next locations selected from the plurality of locations for the network interface card based upon the current location of the network interface card and a set of measured probabilities, wherein each measured probability indicates a probability that the network interface card is at one or more of the next locations, wherein the plurality of wireless networks includes wireless networks associated with the one or more next locations in proportion to the measured probabilities, and wherein selected wireless networks associated with the one or more next locations have a higher historical signal strength than unselected wireless networks associated with the one or more next locations.

2. The method of claim 1, comprising determining the current location of the network interface card based upon a comparison of a plurality of wireless networks currently scanned and a plurality of wireless networks associated with the plurality of locations for the network interface card.

3. The method of claim 1, wherein determining a plurality of locations for the network interface card using one or more processors comprises:

creating a plurality of traces, each trace containing a list of a plurality of wireless network identifiers scanned during a particular period of time;

dividing the plurality of traces into a plurality of segments, each segment comprising at least two traces, the at least two traces grouped into the segment based upon a uniformity of the wireless network identifiers associated with the at least two segments; and creating a plurality of clusters comprised of at least two segments based upon a similarity of the at least two segments, each of the plurality of clusters corresponding to a location.

4. The method of claim 3, wherein the plurality of clusters are created using a K-means algorithm.

5. The method of claim 3, comprising determining a plurality of wireless network identifiers associated with the plurality of clusters based upon a determination that the wireless network identifiers associated with the plurality of clusters are likely to be available at the associated location.

6. The method claim 5, wherein the determination that the wireless network identifiers associated with the plurality of clusters are likely to be available at the associated location comprises determining that the wireless network identifiers associated with particular location are present in that location above a threshold amount of times.

7. The method of claim 1, wherein the wireless networks are wireless networks operating in accordance with an 802.11 family of standards.

8. The method of claim 1, comprising calculating a transition matrix based upon the clustering of similar wireless networks scanned and wherein determining the one or more next locations comprises determining a most probable next locations based upon the transition matrix and the current location of the network interface card.

9. The method of claim 1, wherein scanning for the plurality of wireless networks is done in response to powering down the one or more processors into the low power state.

10. The method of claim 1, wherein responsive to finding one of the plurality of networks associated with one or more next locations, connecting to the found one or more of the plurality of networks, wherein connecting to the found one or more of the plurality of networks includes transitioning the one or more processors from the low power state to the active state.

11. The method of claim 10, comprising waking up one or more of the processors and notifying one or more applications to synchronize data over the connected wireless network responsive to connecting to the found one or more of the plurality of networks.

12. An apparatus of a s (STA), the apparatus comprising: memory; and one or more processors, in combination with the memory, configured to:

determine a plurality of STA locations, the plurality of STA locations determined based upon a clustering of wireless networks scanned by a network interface card communicatively coupled to the processor during an active period of the one or more processors, the one or more processors operating in an active state during the active period; determine a current location of the STA, the current location being one of the plurality of STA locations, wherein the determination of the current location of the STA is completed upon initiation of a transition of the one or more processors from the active state to a low power state; and scan, in the low power state, for a plurality of wireless networks associated with one or more next locations, the one or more next locations selected from the plurality of STA locations based upon the current STA location and a set of measured probabilities, wherein each measured probability indicates a probability that the STA is at one or more of the next locations, wherein the plurality of wireless networks includes wireless networks associated with the one or more next locations in proportion to the measured, probabilities and wherein selected wireless networks associated with the one or more next locations have a higher historical signal strength than unselected wireless networks associated with the one or more next locations.

13. The apparatus of claim 12, wherein the one or more processors are configured to determine the current location of the STA based upon a comparison of a plurality of wireless networks currently scanned and a plurality of wireless networks associated with the plurality of STA locations.

14. The apparatus of claim 12, wherein the one or more processors are configured to determine a plurality of STA locations by:

creating a plurality of traces, each trace containing a list of a plurality of wireless network identifiers scanned during a particular period of time;

dividing the plurality of traces into a plurality of segments, each segment comprising at least two traces, the at least two traces grouped into the segment based upon a uniformity of the wireless network identifiers associated with the at least two segments; and creating a plurality of clusters comprised of at least two segments based upon a similarity of the at least two segments, each of the plurality of clusters corresponding to a location.

15. The apparatus of claim 14, wherein the plurality of clusters are created using a K-means algorithm.

16. The apparatus of claim 14, wherein the one or more processors are configured to determine a plurality of wireless network identifiers associated with the plurality of clusters based upon a determination that the wireless network identifiers associated with the plurality of clusters are likely to be available at the associated location.

17. The apparatus of claim 16, wherein the one or more processors are configured to determine that the wireless network identifiers associated with the plurality of clusters are likely to be available at the associated location by determining that the wireless network identifiers associated with a particular location are present in that location above a threshold amount of times.

18. The apparatus of claim 12, wherein the wireless networks are wireless networks operating in accordance with an 802.11 family of standards.

19. The apparatus of claim 12, wherein the one or more processors are configured to calculate a transition matrix based upon the clustering of similar wireless networks scanned and wherein the one or more processors are configured to determine the one or more next locations by determining a most probable next locations based upon the transition matrix and the current STA location.

20. apparatus of claim 12, wherein the one or more processors are configured to scan for the plurality of wireless networks in response to powering down the one or more processors into the low power state.

21. The apparatus of claim 12, wherein the one or more processors are configured to connect to the found one or more of the plurality of networks in response to finding one of the plurality of networks associated with one or more next locations, wherein configuring the one or more processors to connect to the found one or more of the plurality of networks transitions the one or more processors from the low power state to the active state.

22. The apparatus of claim 21, wherein the one or more processors are configured to wake up and notify one or more applications to synchronize data over the connected wireless network responsive to connecting to the found one or more of the plurality of networks.

23. A non-transitory machine readable medium that stores instructions which when performed by an apparatus of a station (STA) machine, cause the STA machine to perform operations comprising:

determine a plurality of STA machine locations, the plurality of STA machine locations determined based upon a clustering of wireless networks scanned by a network interface card communicatively coupled to one or more processors during an active period of the one or more processors, the one or more processors operating in an active state during the active period;

determine a current location of the STA machine, the current location being one of the plurality of STA machine locations, wherein the determination of the current location of the STA machine is completed upon initiating a transition of the one or more processors from the active state to a low power state; and scan, in the low power state, for a plurality of wireless networks associated with one or more next locations, the one or more next locations selected from the plurality of STA machine locations based upon the current STA machine location and a set of measured probabilities, wherein each measured probability indicates a probability that the STA machine is at one or more of the next locations, and wherein the plurality of wireless networks includes wireless networks associated with the one or more next locations in proportion to the measured probabilities, wherein selected wireless networks associated with the one or more next locations have a higher historical signal strength than unselected wireless networks associated with the one or more next locations.

24. The non-transitory machine readable medium of claim 23, wherein the instructions for determining the current location of the STA machine include instructions, which when performed by the apparatus of the STA machine, cause the apparatus of the STA machine to determine the current location of the STA machine based upon a comparison of a plurality of wireless networks currently scanned and a plurality of wireless networks associated with the plurality of STA machine locations.

25. The non-transitory machine readable medium of claim 23, wherein the instructions for determining a plurality of STA machine locations comprise instructions which when performed by the apparatus of the STA machine, cause the apparatus of the STA machine to perform the operations of:

creating a plurality of traces, each trace containing a list of a plurality of wireless network identifiers scanned during a particular period of time;

dividing the plurality of traces into a plurality of segments, each segment comprising at least two traces, the at least two traces grouped into the segment based upon a uniformity of the wireless network identifiers associated with the at least two segments; and creating a plurality of clusters comprised of at least two segments based upon a similarity of the at least two segments, each of the plurality of clusters corresponding to a location.

26. The non-transitory machine readable medium of claim 25, wherein the instructions for creating a plurality of clusters include instructions which when performed by the apparatus of the STA machine cause the apparatus of the STA machine to create the plurality of clusters using a K-means algorithm.

27. The non-transitory machine readable medium of claim 25, wherein the instructions for determining the plurality of wireless network identifiers associated with the plurality of clusters comprises instructions, which when performed by the apparatus of the STA machine, cause the apparatus of the STA machine to determine the plurality of wireless network identifiers based upon a determination that the wireless network identifiers associated with the plurality of clusters are likely to be available at the associated location.

28. The non-transitory machine readable medium of claim 27, wherein the instructions for determining that the wireless network identifiers associated with the plurality of clusters are likely to be available at the associated location includes instructions which when performed by the apparatus of the STA machine causes the apparatus of the STA machine to perform the operations of determining that the wireless network identifiers associated with a particular location are present in that location above a threshold amount of times.

29. The non-transitory machine readable medium of claim 23, wherein the wireless networks are wireless networks operating in accordance with an 802.11 family of standards.

30. The non-transitory machine readable medium of claim 23, wherein the instructions include instructions which when performed by the apparatus of the STA machine, cause the apparatus of the STA machine to perform the operations of calculating a transition matrix based upon the clustering of similar wireless networks scanned and wherein the instructions for determining the one or more next locations include instructions, which when performed by the apparatus of the STA machine cause the apparatus of the STA machine to perform the operations of determining a most probable next locations based upon the transition matrix and the current STA machine location.

31. The non-transitory machine-readable medium of claim 23, wherein the instructions include instructions which when performed by the apparatus of the STA machine cause the apparatus of the STA machine to scan for the plurality of wireless networks in response to powering down the one or more processors into the low power state.

32. The non-transitory machine-readable medium of claim 23, wherein the instructions include instructions which when performed by the apparatus of the STA machine cause the apparatus of the STA machine to perform the operations of:

responsive to finding one of the plurality of networks associated with one or more next locations, connecting to the found one or more of the plurality of networks, wherein connecting to the found one or more of the plurality of networks includes transitioning the one or more processors from the low power state to the active state.

33. The non-transitory machine-readable medium of claim 32, wherein the instructions include instructions which when performed by the apparatus of the STA machine cause the apparatus of the STA machine to perform the operations of:

waking up the processor and notifying one or more applications to synchronize data over the connected wireless network responsive to connecting to the found one or more of the plurality of networks.

34. An apparatus comprising:

at least one processor;

a network interface card; and at least one machine readable medium including instructions that, when executed by the at least one processor, configure the at least one processor to complete operations to:

determine a plurality of user locations, the plurality of user locations determined based upon a clustering of wireless networks seen by a computing device during an active period of the computing device;

determine a current location of the user, the current location being one of the plurality of user locations, wherein the determination of the current location of the user is completed upon initiation of a transition of the computing device from an active period to an inactive period;

select one or more next locations from the plurality of user locations based upon the current user location and a set of measured probabilities, wherein each measured probability indicates a probability that the user is at one or more of the next locations, wherein the plurality of wireless networks includes wireless networks associated with the one or more next locations in proportion to the measured probabilities, wherein selected wireless networks associated with the one or more next locations have a higher historical signal strength than unselected wireless networks associated with the one or more next locations, and wherein selecting the one of more next locations is completed during the inactive period of the computing device; and output the plurality of wireless networks associated with one or more next locations to the network interface card.

35. The apparatus of claim 34, wherein the instructions further configure the at least one processor to perform operations to determine the current location of the user based upon a comparison of a plurality of wireless networks currently scanned and a plurality of wireless networks associated with the plurality of user locations.

36. The apparatus of claim 34, wherein the instructions further configure the at least one processor to perform operations to: create a plurality of traces, wherein each trace contains a list of a plurality of wireless network identifiers scanned during a particular period of time;

divide the plurality of traces into a plurality of segments, each segment comprising at least two traces, the at least two traces grouped into the segment based upon a uniformity of the wireless network identifiers associated with the at least two segments; and create a plurality of clusters comprised of at least two segments based upon a similarity of the at least two segments, wherein each of the plurality of clusters corresponds to a location.

37. The apparatus of claim 36, wherein the instructions further configure the at least one processor to perform operations to determine a plurality of wireless network identifiers associated with the plurality of clusters based upon a determination that the wireless network identifiers associated with the plurality of clusters are likely to be available at the associated location.

38. The apparatus of claim 37, wherein the instructions further configure the at least one processor to perform operations to determine that the wireless network identifiers associated with the plurality of clusters are likely to be available at the associated location by determining that the wireless network identifiers associated with a particular location are present in that location above a threshold amount of times.

39. The apparatus of claim 34, wherein the instructions further configure the at least one processor to perform operations to calculate a transition matrix based upon the clustering of similar wireless networks scanned and wherein the selection module is configured to determine the one or more next locations by determining a most probable next locations based upon the transition matrix and the current user location.

* * * * *

UNITED STATES PATENT AND TRADEMARK OFFICE

CERTIFICATE OF CORRECTION

PATENT NO. : 9,883,331 B2
APPLICATION NO. : 13/997819
DATED : January 30, 2018
INVENTOR(S) : Agerstam et al.

It is certified that error appears in the above-identified patent and that said Letters Patent is hereby corrected as shown below:

In the Claims

In Column 18, Line 23, in Claim 6, after "method", insert --of--

In Column 18, Line 27, in Claim 6, after "with", insert --a--

In Column 18, Line 54, in Claim 12, delete "s" and insert --station-- therefor

In Column 19, Line 12, in Claim 12, delete "measured, probabilities" and insert --measured probabilities,-- therefor In Column 19, Line 64, in Claim 20, before "apparatus", insert --The--

Signed and Sealed this
Fourteenth Day of April, 2020

Andrei Iancu
*Director of the United States Patent and Trademark Office*